F. W. VICKERY.
LIFTING TRUCK.
APPLICATION FILED JUNE 6, 1921.

1,403,992.

Patented Jan. 17, 1922.
2 SHEETS—SHEET 1.

Inventor
Frederick W. Vickery
By
Attorney

F. W. VICKERY.
LIFTING TRUCK.
APPLICATION FILED JUNE 6, 1921.

1,403,992.

Patented Jan. 17, 1922.
2 SHEETS—SHEET 2.

Inventor
Frederick W. Vickery,
By
Attorney

UNITED STATES PATENT OFFICE.

FREDERICK WILLIAM VICKERY, OF LONDON, ENGLAND.

LIFTING TRUCK.

1,403,992.  Specification of Letters Patent.  Patented Jan. 17, 1922.

Application filed June 6, 1921. Serial No. 475,484.

*To all whom it may concern:*

Be it known that I, FREDERICK WILLIAM VICKERY, a subject of the King of Great Britain, residing at London, England, have invented certain new and useful Improvements in Lifting Trucks, of which the following is a specification, for which I have filed an application in Great Britain No. 7942, dated Mar. 17, 1920.

This invention relates to lifting trucks and particularly to that type of truck in which an elevatable body is mounted upon a wheeled gear and the handle of the truck is used as a jack for elevating the body.

In my British Patent No. 155,865 is disclosed a truck of the type referred to and the present invention is an improvement upon the truck disclosed in said patent and has for its object the provision of means whereby the handle and elevatable body are automatically coupled together, ready for the lifting operation, by a device responsive to contact with a receptacle or other load placed, or to be placed, upon said truck.

It is not intended, however, that my improvement shall be limited in its application to the truck shown in said British patent. On the contrary, it is applicable, in as broad a sense as the state of the prior art permits, to the automatic coupling of the elevating body with the lifting means in all trucks of the character indicated.

In the drawings:—

Figure 1:
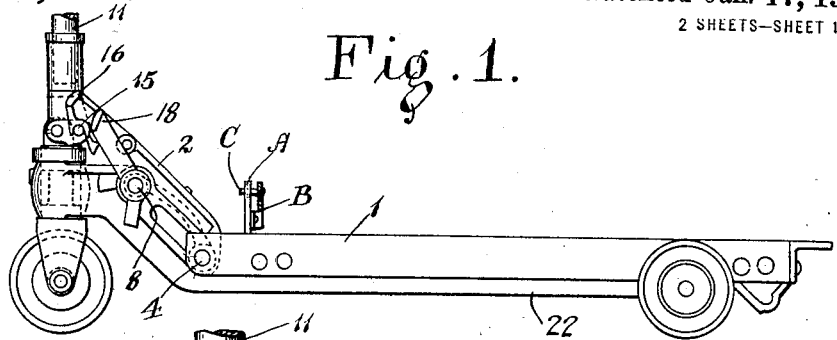
Figure 1 is a side elevation of a truck embodying my invention and Figure 2 is a part sectional side elevation of the forward part of said truck.

Referring to the several figures of the drawings, Fig. 1 is a side elevation of a lifting truck, such as described in my British Patent No. 155,865, comprising a wheeled body 22 on which is supported an elevatable platform 1. Pivotally secured to the forward end of said platform by means of a shaft 4 are a pair of coupling members 2, each provided with a pair of hooks 24 and 25 which are engageable with pins 15 mounted upon the handle which is pivotally supported as at 23 to the forward end of the wheeled body. Pivotally mounted upon the same shaft 4 as the coupling members 2 is a pawl 5 having a plurality of hooks 26 and 27, either one of which may engage with a shoulder 28 formed by a half-round portion of a shaft 8 which is mounted in a bearing in the wheeled body 1 and is provided with a foot lever 18 (best shown in Fig. 3) by means of which it may be given a partial rotation. When the handle 11 is free from engagement with the coupling members 2 it may be swung in a forward direction for the purpose of pulling and steering the truck without elevating the platform 1, but when the coupling members 2 are thrown forwardly so that the hooks 24 engage the pins 15, a forward movement of the handle 11, acting through the pivotal connection 23 as a fulcrum, lifts the coupling members 2 and raises the forward end of the platform. Means are provided on the rear end of the platform for raising it an equal distance with the front or forward end, but since such means are not involved in the present invention they are neither shown nor described.

Figure 2:
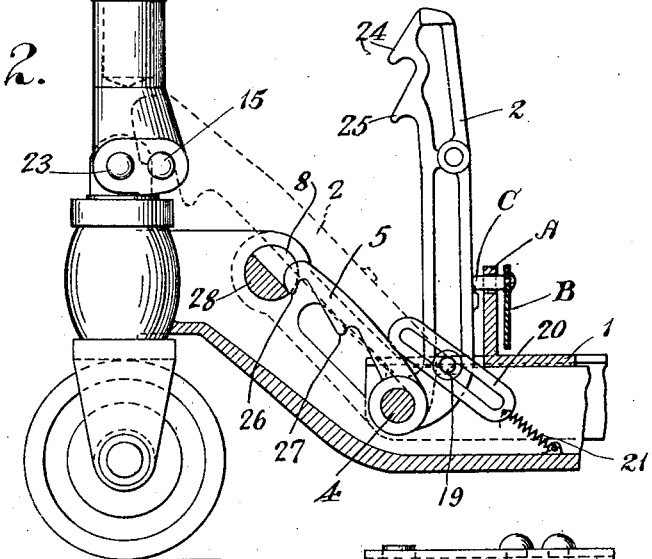

When the hooks 24 are in engagement with the pins 15 the forward movement of the handle 11 advances the hook 26 on the pawl 5 until it falls over the upper shoulder of the half-round portion of the shaft 8. This holds the platform 1 in elevated position so that the handle may be swung back to a vertical position until the pins 15 engage the lower hooks 25 of the coupling members. A successive lifting movement of the handle will then raise the coupling members until the hook 27 is advanced to a position where it drops over the upper shoulder of the half-round portion of the shaft 8. Thus the platform 1 is lifted by stages and as many hooks may be provided on each of the coupling members 2 and upon the pawl 5 as are desired. For the purpose of returning the coupling members to normal position when disengaged from the pins 15 the coupling members 2 are connected by a shaft 19 having its opposite ends extending through a pair of slotted elements 20, each held at its lower end by a spring 21 which is anchored to the wheeled body of the truck. When the coupling members are in their normal or vertical position, as shown in Fig. 2, there is lost motion between the ends of the shaft 19 and both ends of the slots of the elements 20 in which the ends of said shaft work, but if the coupling members 2 are thrown forward to the position indicated in dotted lines the ends of the shaft 19 advance to the upper ends of the slotted elements 20 and, when the platform 1 is lifted, the ends of the shaft 19 move further forward putting the springs 21 under tension. When it is desired to lower the platform, the foot lever 18 is depressed which partially rotates the shaft 8, thus moving the half-round portion into such a position that the shoulder thereof slips from under the hook 26 or 27, as the case may be. At the same time the half-round portion of the shaft 8 engages the under sides of the coupling members 2 and trips the hooked ends thereof from engagement with the pins 15. The spring 21 may then pull the coupling members 2 back to the substantially vertical position shown in Fig. 2.

Any suitable checking device may be employed to control the descent of the platform 1.

Figure 3:
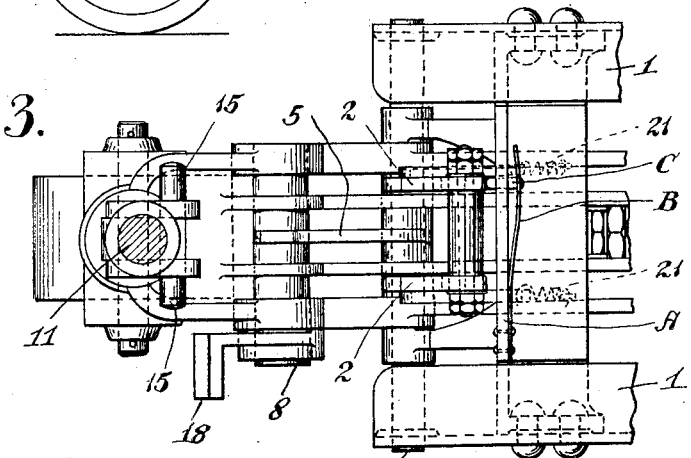
Figure 3 a plan view of the structure shown in Figure 2.

Secured to the frame of the platform 1 near its forward end is a transverse supporting flange A which preferably is formed of angle iron securely riveted or bolted to the platform 1 as shown in Fig. 3. A leaf spring B is secured to that side of the supporting flange which is adjacent to that part of the truck which is to receive the load. The forward or free end of the spring B carries a hammer pin C which passes through an aperture in the supporting flange A and lies in the path of motion of one of the coupling members 2.

The coupling members, when in their normal or vertical position, rest against the forward side of the supporting flange A with that coupling member 2 which is adapted to contact with the projecting end of the hammer pin C out of contact with the latter. In this position the coupling members are stable since they are so curved near the ends which are pivoted on the shaft 4 that the preponderance of their mass, when in their vertical position, lies to one side of their pivotal connection with the platform.

When the truck is to be loaded, the platform 1 is pushed beneath the load until said load comes into contact with the leaf spring B, thus forcing the hammer pin C into contact with the coupling member 2 which is associated therewith throwing said coupling member and the other coupling member over to the left (Figs. 1 and 2) so that the outermost hooks 24 of said coupling members engage with the pins 15. When the coupling members are released and return to the position shown in full lines in Fig. 2, that coupling member 2 which is associated with the hammer pin C remains slightly away from its position of repose through contact with the hammer pin until the load is removed from the truck, whereupon the leaf spring B will withdraw the pin C from contact with said coupling member and permit both coupling members 2 to move by gravity against the forward side of the supporting flange A.

If the spring 21 for returning the coupling members 2 is not employed, then either the spring controlled pin C or the coupling members 2 must be furnished with a member capable of moving out of the track of the coupling members 2 on the return or replacement of the latter, that is to say, the coupling members 2 must be able to move back to their normal vertical position, notwithstanding the fact that the member C which pushed them from that position is still in their path.

Figure 4:
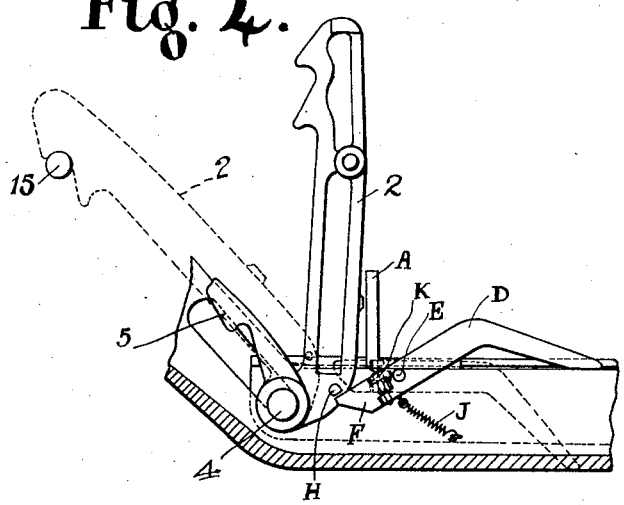
Figure 4 is a part sectional side elevation and Figure 5 a plan view of a modified form of my invention.
Figure 5:
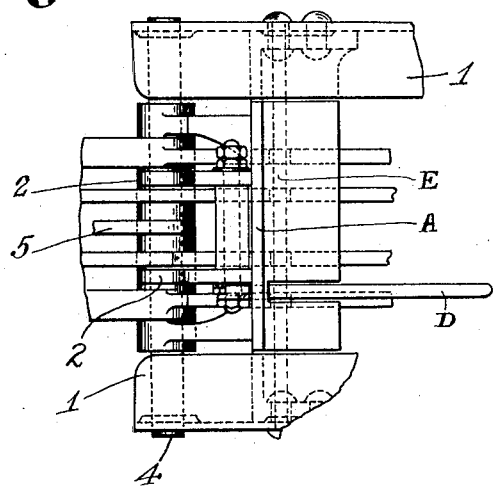
Figure 6:
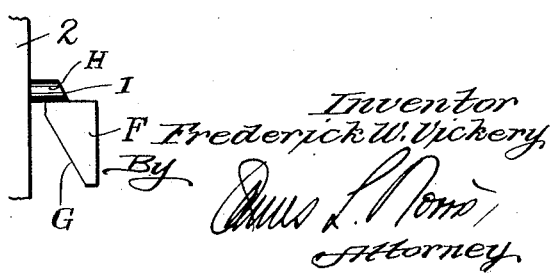
Figure 6 is an end view of the rocking pawl and the associated pin shown in Figs. 4 and 5.

Figures 4, 5 and 6 show such a member in the form of a rocking lever D pivoted at E near the forward end of the lifting platform and carrying at one end a pawl F having an angled side G. The pawl is preferably spring controlled and gives a positive movement to the coupling members 2 by engaging a pin H carried by one side of one of the coupling members 2 when the free end of the rocking lever D is depressed by the load whilst the truck is being pushed under same. This causes the pin H to be thrown clear of the pawl F. A free movement of the coupling members 2 in the other direction is ensured by reason of the pawl F being held with its top surface just above the line of travel of the pin H on the coupling member while the load carried by the truck engages the rocking lever. When the truck is moved and the load is removed from the lifting platform 1 the rocking lever D will be caused to resume its normal position by a spring J which connects the pawl end of the rocking lever D with the lifting platform and moves said pawl end downwardly. The pin H has a beveled end, over which the angled side G of the pawl F rides and which pushes said pawl outwards on its hinge K until the pawl F is free of the pin H when the pawl F will spring back to its normal position under the pin H ready for a fresh operation.

What I do claim as my invention and desire to secure by Letters Patent is:—

1. In a lifting truck, an elevatable platform, elevating means therefor, said means being normally disengaged from said platform, a coupling member for placing said platform and elevating means into and out of operative relationship, and means actuated by contact with the load on the truck for throwing said coupling member into coupling relationship with said platform and elevating means.

2. In a lifting truck, an elevatable platform, elevating means therefor, said means being normally disengaged from said platform, a coupling member pivotally secured to said platform and engageable with said elevating means, and means actuated by contact with the load on the truck for throwing said coupling element into engagement with said elevating means.

3. In a lifting truck, an elevatable platform, elevating means therefor, said means being normally disengaged from said platform, a coupling member pivotally secured to said platform and engageable with said elevating means, and means actuated by contact with the load on the truck for throwing said coupling element into engagement with said elevating means, comprising a spring retracted hammer pin lying normally out of engagement with said coupling member and in position to be engaged by said load.

4. In a lifting truck, an elevatable platform, elevating means therefor, said means being normally disengaged from said platform, a coupling member pivotally secured to said platform and engageable with said elevating means, means actuated by contact with the load on the truck for throwing said coupling member into engagement with said elevating means and resilient means for returning said coupling member to normal position when disengaged from said elevating means.

5. In a lifting truck, an elevatable platform, elevating means therefor, said means being normally disengaged from said platform, a coupling member pivotally secured to said platform and engageable with said elevating means, a transverse supporting flange on said platform, said flange being perforated in the plane of movement of said said coupling member, a spring supported on the load side of said supporting flange, a hammer pin slidably mounted in said aperture and secured at one end to said spring, said hammer pin being normally retracted toward the load side of said supporting flange by said spring and engaging said coupling member when said spring is compressed to throw said coupling member into engagement with said elevating means.

In testimony whereof I have hereunto set my hand in presence of two subscribing witnesses.

FREDERICK WM. VICKERY.

Witnesses:
RICHARD CASE GARDNER,
LYNWOOD F. GARDNER.